United States Patent
Steketee

(10) Patent No.: US 7,094,340 B2
(45) Date of Patent: Aug. 22, 2006

(54) ANTI-SPRAY AQUARIUM AIRLIFT TUBE ELBOW

(76) Inventor: Thomas G. Steketee, 7095 Hollywood Bl., #1327, Los Angeles, CA (US) 90028-8903

( * ) Notice: Subject to any disclaimer, the term of this patent is extended or adjusted under 35 U.S.C. 154(b) by 45 days.

(21) Appl. No.: 10/708,924

(22) Filed: Apr. 1, 2004

(65) Prior Publication Data

US 2004/0211716 A1    Oct. 28, 2004

Related U.S. Application Data

(60) Provisional application No. 60/320,130, filed on Apr. 22, 2003.

(51) Int. Cl.
*A01K 63/04*    (2006.01)
*C02F 1/74*    (2006.01)

(52) U.S. Cl. ............ 210/169; 210/220; 210/232; 119/263

(58) Field of Classification Search ............ 210/169, 210/220, 221.1, 221.2, 232; 119/263; 96/188–190, 96/358; 285/31, 32, 302
See application file for complete search history.

(56) References Cited

U.S. PATENT DOCUMENTS

| | | | | |
|---|---|---|---|---|
| 2,614,529 A | * | 10/1952 | Hansen | 210/169 |
| 3,616,919 A | * | 11/1971 | Feddem et al. | 210/169 |
| 4,017,735 A | * | 4/1977 | Siegel | 250/430 |
| 4,385,989 A | * | 5/1983 | Margolis | 210/169 |
| 4,879,771 A | * | 11/1989 | Piskula | 4/256.1 |
| 5,139,659 A | * | 8/1992 | Scott | 210/169 |
| 5,234,581 A | * | 8/1993 | Rosenberg | 210/151 |
| 5,665,227 A | * | 9/1997 | Watt | 210/169 |
| 6,634,034 B1 | * | 10/2003 | Rendell | 4/252.4 |

FOREIGN PATENT DOCUMENTS

JP    P2000-229685    *    8/2000

* cited by examiner

*Primary Examiner*—Fred G. Prince

(57) ABSTRACT

An exit elbow for an aerated aquarium lift tube, designed so that by the combination of a top-most air release baffle and a submerged release jet, that the inevitable water spray from the implosion of aeration bubbles is contained within the exit elbow itself and not released into the atmosphere in the proximity of the tank's water surface or the lighting hood.

8 Claims, 4 Drawing Sheets

ANTI-SPRAY AQUARIUM AIRLIFT TUBE ELBOW

CROSS REFERENCE TO RELATED APPLICATIONS

This application claims the benefit of the filing date of U.S. provisional application No. 60/320,130 filed on Apr. 22, 2003.

BACKGROUND OF INVENTION

The present invention generally relates to animal husbandry in the form of aquatic animal culturing, aquarium aerators and or to a terminus for a commonly known system of liquid purification or separation, structural installation, closed circulating system for an aquarium.

An unfortunate consequence of the use in aquariums of popular undergravel filter plates, aeration lift tubes and standard exit elbows is that a stream of aeration bubbles is carried by the water flow from the standard exit elbow and subsequently across the surface of the water in the tank. The work of aeration and flow already having been accomplished within the airlift tube, the resultant wide stream of aeration bubbles, although not necessarily unpleasant to look at, serves little purpose.

The surface stream of aeration bubbles, while at the same time as serving little purpose, in fact, can be very harmful to both the function and the appearance of the aquarium as will be explained.

One need only put one's hand within an inch or two of the stream of aeration bubbles flowing across the surface of the water to verify that indeed, upon the continuous implosion of aeration bubbles, a fine spray of water is being impelled continuously into the atmosphere in this vicinity.

This is of little concern in a fresh water aquarium without a light hood, except that there will be a noticeable fine spotting around the edges of the tank. However, in a tank fitted with a light hood, it is inevitable that given a water level within a few inches of the top rim of the tank, that the glass or Plexiglas underside of the light hood will become constantly wetted from the never ending fine spray of water. Furthermore, it is all too likely that a thick, dark green film of algae, more than sufficient to completely block the intended light coming from the fluorescent tubes in the light hood, will form in this environment due to the light, warmth and constant fine spray of water onto the bottom of the light hood. As well, even more algae, although not as thick, will likely form on the underside of the horizontal structural surface that is found on the top of all Plexiglas tanks.

It is unacceptable to move the light hood further away, as this would diminish the often hard won illumination level. And there is not much you can do about the aeration spray landing on the underside of the horizontal surface that is found on the top of all Plexiglas tanks, altogether, other than lowering the water level drastically to what would be an unattractive level and also make waste of the water capacity of the aquarium.

In a saltwater aquarium these problems are compounded by a puddle of wet encrusted salt forming around the wet undersides of the light hoods, which since they are sitting on the Plexiglas horizontal surface on the top of the tank, carry a substantial quantity of the water sprayed onto the underside of the light hood onto the top surface of the Plexiglas itself, which ends up creeping across the surface and eventually encrusting down the sides of the tank and in particular forming in very large quantities behind the tank where one is not likely to see the accumulated salt, or even reach it, if the tank is sitting against a wall.

Even in a saltwater tank that is glass and has no light hood, water spray from the implosion of aeration bubbles lands on the filter tubes, airline tubes, tank top edges and any nearby walls. This small amount of fine spray of saltwater actually making its way outside of the tank, while hardly noticeable in a fresh water tank, eventually leads to huge amounts of encrusted salt deposits on the tank top edges, tank sides, all nearby aeration and filter tubes and on the wall when enjoying the use of a saltwater aquarium.

Aerating smaller containers without any airlift tubes, such as might be done to raise brine shrimp, creates even heavier saltwater spray from the implosion of aeration bubbles.

Clearly, since the surface stream of aeration bubbles serves little purpose, it would be desirable to eliminate the thousands of imploding aeration bubbles making their insidious way across the surface of the water, and yet still enjoy the benefits and ample aeration of an undergravel filter and aquarium airlift tube.

Numerous devices designed as a terminus for a stream of aerated water from an airlift tube have been disclosed in prior art. In all cases, the terminus devices described have been for the purpose of increased filtration of the water and not merely to contain spray, if not just a simple elbow. U.S. Pat. No. 2,676,921 to Vansteenkiste (1954) contains an unusually complete references cited section in regard to the early progression of airlift tubes and closed circulating systems for use in aquariums.

Furthermore, certain devices such as most protein skimmers, provide some means for the separation of aeration bubbles from the water stream, usually a simple half wall or else a downdraft tube, since by their nature the foam must be collected in one spot. Some even utilize extra aeration bubbles in a separated airlift tube for the purpose of creating a counter flow in the water. In any case, such devices would not work for containing the aeration spray from a commonly known standard airlift tube, and the models that separate aeration bubbles from the exit stream require a water pump.

U.S. Pat. No. 3,778,976 to Pond (1973) discloses a degasser having baffle means to cause the water to flow downwardly in a zigzag path. The stated purpose, however, is to degas harmful gasses from the water and not merely to contain the aeration bubbles in said degasser, although it will do both. This device requires a water pump and would also not function to contain aeration spray from a standard airlift tube.

U.S. Pat. No. 5,275,123 to Geung (1994) discloses a separate upright column, having an open top in combination with a water pump for spraying water for the express purpose of containing aeration bubbles in said upright column. Although effective, this design would also not work without a water pump, relies on downward water direction water flow, and will not function to contain aeration bubbles if the flow of water is in an upward direction, as with a standard airlift tube.

SUMMARY OF INVENTION

Through a few simple modifications, it is possible to create an anti-spray aquarium airlift tube elbow, that although removing all aeration bubbles and the resultant water spray, is hardly more costly to manufacture than the standard airlift tube elbows already currently used.

By replacing the top of an exit elbow with a simple air baffle consisting of sequential opposing shelves, the air contained within the constantly imploding aeration bubbles is given a place to escape, yet no water spray will be able to make its way around the baffles without landing and flowing back into the exit elbow.

Then by the addition of an outer cylindrical tube and moving the portal for the exit jet underwater, so that all aeration bubbles can rise out of the flowing water through natural buoyancy before the water's exit, an aeration bubble free jet of water can be obtained.

By creating a hole that passes through the consecutive air baffle shelves, a passageway can be made through which to place airline tubing.

All functionality will be lost if the water level is above the air baffles, so the water level may not exceed this point. To solve this problem for those who might wish to upgrade their standard airlift tube elbows, but who have existing airlift tubes that are too short, and to give everyone more freedom in choosing the perfect water level, an airlift tube height adjuster is desired.

Through the use of a threaded piece that will wedge onto the top of a standard airlift tube, an airlift tube height adjuster that can raise the height from a short amount of its length, all the way up to its full length is obtained. This method of height adjustment can be built into the anti-spray airlift tube elbow itself, as well as being made available as an interconnecting standalone unit for use with any exit elbow.

For the limited, although important use of professional aquaculture, a standalone anti-spray aerator can be made using the exact same principles, simply by providing openings in the base for the entry of water. A more satisfactory way to aerate phytoplankton, rotifers, newly hatched microscopic fish and brine shrimp in a small, shallow container can then be obtained, also saving your lighting fixtures and all nearby surfaces from being fouled by spray.

These and other objectives of the invention will become more apparent to those skilled in the art by reference to the following detailed description when viewed in light of the accompanying drawings therein.

DETAILED DESCRIPTION

Figure 1:
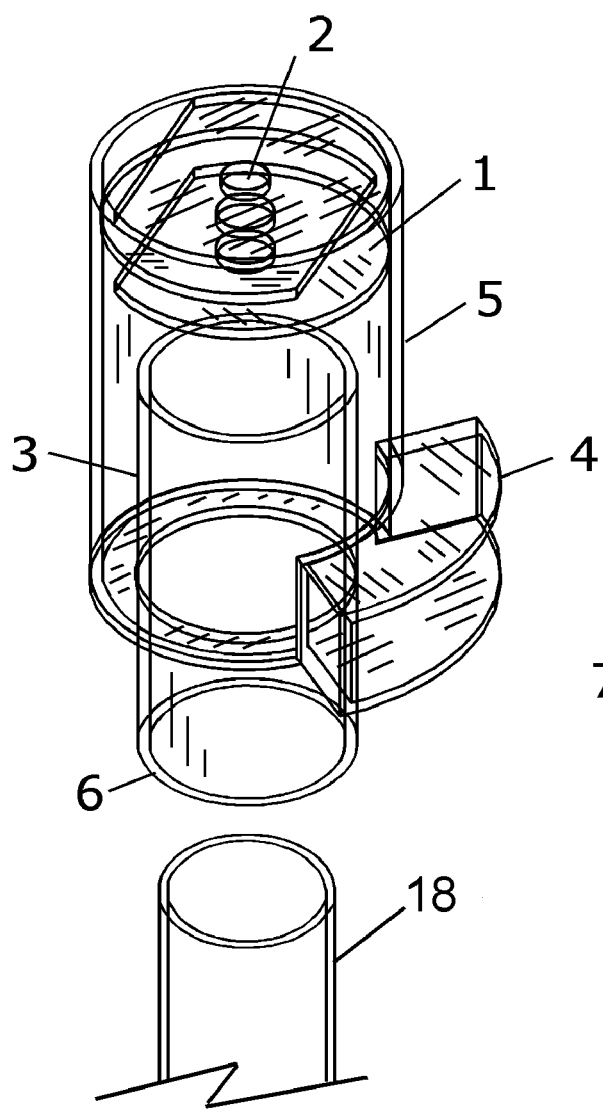
FIG. 1 is a see-through perspective of an anti-spray airlift tube elbow.

Referring now to the drawings wherein like parts are indicated by like numerals, the numeral 1 indicates an air baffle created by the use of stacked, sequential opposing shelves, each shelf of which does not completely reach from one side to the other of the outer cylindrical tube 5 which contains them.

Airline tubing inserted through airline tubing holes 2, is passed through the inner cylindrical tube 3, which has in turn been placed upon an existing airlift tube 18 by compression fitting the lower opening in the inner cylindrical tube 6 over the top of the existing standard airlift tube 18. Preferably fitted with an air stone, air pressure is then applied to the airline tubing and water flow is created from the airlift tube due to the buoyancy of the aeration bubbles, as is already very well known how to do.

Water and aeration bubbles, upon entering the anti-spray airlift tube elbow FIG. 1, continue to flow upward until reaching the top of the inner cylindrical tube 3. The aeration bubbles at this time, due to their natural buoyancy, will seek the top of the water level which will preferably be somewhere beneath the bottom shelf of the air baffle 1 and somewhere above the water flow exit jet 4. Water that is free of imploding aeration bubbles will then flow downwards between the inner wall of the outer cylindrical tube 5 and the outer wall of the inner cylindrical tube 3 due to the natural acceleration of gravity.

So long as the downward force of the water flow does not exceed the upward force of the buoyancy of the aeration bubbles, all water reaching the exit jet 4 will be free of aeration bubbles, yet nonetheless already be aerated. All aeration bubbles remaining contained within the outer cylindrical tube 5 will eventually implode, releasing air and water spray into the atmosphere beneath the bottom shelf of the air baffle 1. Although the air released will easily flow around the sequential opposing shelves of the air baffle, water spray will land before reaching the top shelf and flow back downward without any water spray being released into the atmosphere outside of the anti-spray airlift tube elbow FIG. 1.

Figure 2:
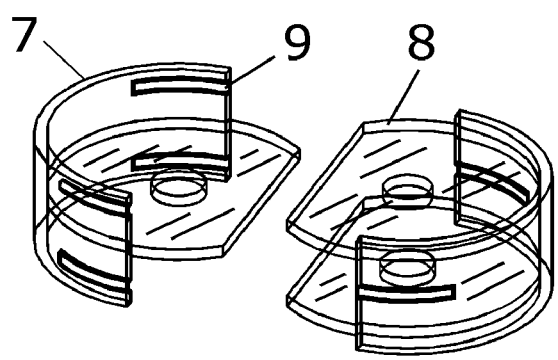
FIG. 2 is an exploded see-through perspective of an interlocking air baffle.

A method of forming the air baffle 1 which allows the pieces to be more easily formed using modern plastic molding techniques and which has the added benefit of allowing the consumer to take the anti-spray airlift tube elbow FIG. 1 apart in order to allow access to the interior surfaces for cleaning should the pieces become fouled by algae is shown in FIG. 2. Through separation of the sequential opposing shelves 8 into two interlocking half cylindrical shells 7 with female indentations 9 formed into their sides, to accept the male portions of the opposing shelves 8, this is easily obtained.

By creating a slight pitch in the sides of the half cylindrical shells 7 in favor of a larger diameter at the top and a slightly smaller diameter on the bottom, and creating a matching pitch in the outer cylindrical tube 5 which is also in favor of a larger diameter at the top and a slightly smaller diameter lower down, when placing the two piece interlocking air baffle FIG. 2 into the interior top portion of the outer cylindrical tube 5, a snug compression fit can be easily obtained by the consumer, automatically wedging all three pieces together. Yet the pieces will be able to be removed later to allow for cleaning of the interior surfaces, for the continued satisfaction and long use by the consumer.

In a similar manner, a slight pitch can be created for the bottom opening of the inner cylindrical tube 6 to allow easy placement over the exterior surface of a standard airlift tube and subsequent compression wedge fit, in the manner most commonly already done by others.

Although a standard ¼" airline tubing, when its end has been flared from long use, can be forced through a standard ¼" hole after some struggle; due to the three vertically aligned airline tubing holes 2, the lower two holes are preferably made larger in order to ease the reuse of flared airline tubing if and when required.

Because the junction where the exit jet 4 and the inner cylindrical tube 3 meet will not allow entry of fish greater than 0.175 inches wide, as shown, there is no great need to add a fish protection grill as is commonly seen on many standard airlift tube elbows, although one could still be added. The ring forming this gap, although narrow, in fact, represents a greater area overall than the airlift tube itself and could, therefore, be made even narrower.

Although some airlift tubes already have a built in telescoping feature, consisting of a sliding wedge which compression fits the standard airlift tube into a short extension tube which in turn attaches to the undergravel filter, this is of little use to those upgrading their airlift tube elbows who don't already have this feature. Furthermore, there is no guarantee that the manufacturers of airlift tubes, even with a telescoping feature, will have included airlift tubes capable of reaching precisely the correct height. In other words, airlift tubes that are too short even when telescoped to their full height, or too tall when telescoped all the way down, might have been included. So in the case of consumers not having newly purchased airlift tubes made to the correct height, or upon having made a conscious decision to vary the water level in their tanks, some better method of obtaining height adjustment for use with third party airlift tubes would be desirable.

Figure 3:
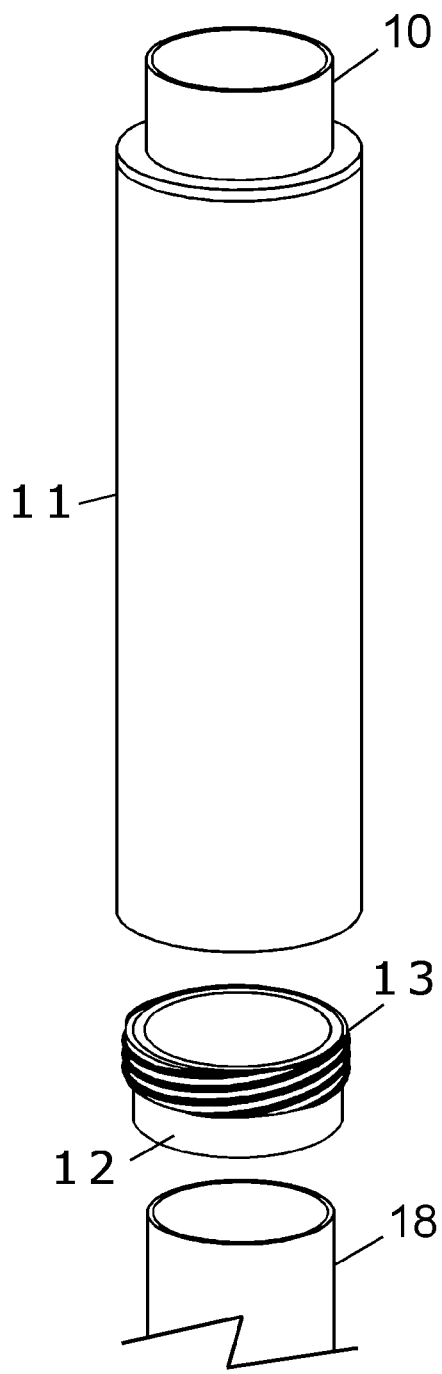
FIG. 3 is a perspective of an airlift tube height adjuster.
Figure 4:
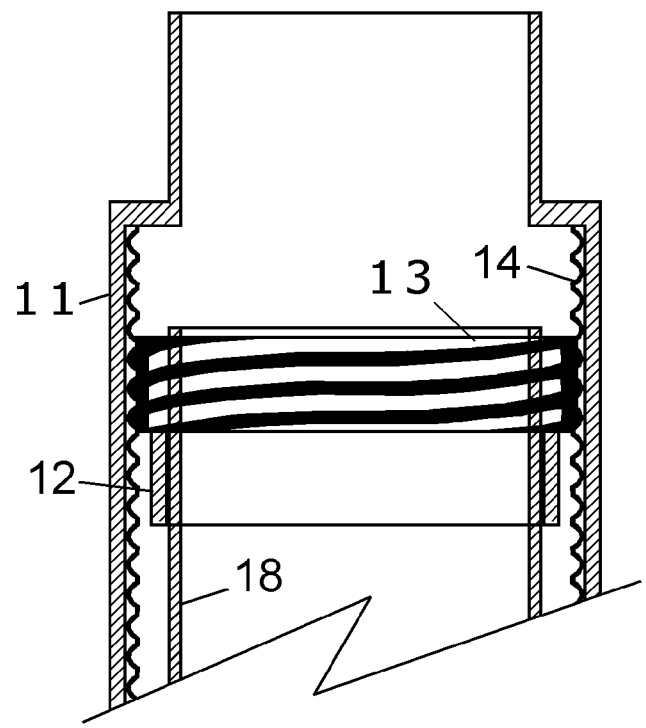
FIG. 4 is a clipped plane elevation of an airlift tube height adjuster.

An adjustable airlift tube height adjuster is shown in FIGS. 3–4. By allowing a cylindrical tube 11, fitted with interior threads 14, to extend downward over an existing standard airlift tube 18, and which screws onto the threaded portion 13 of a short cylindrical tube 12 which has been compression fit over the top of the standard airlift tube 18, an airlift tube height adjuster FIGS. 3–4 capable of adjustment from a small amount of its length to the full available extension of its length is therefore obtained.

An extended cylindrical tube 10 on the top of the airlift tube height adjuster FIGS. 3–4 that has the same outer diameter as a standard airlift tube 18, allows any standard airlift tube terminus to be attached.

The features of the airlift tube height adjuster FIGS. 3–4 and the anti-spray airlift tube elbow FIG. 1 can be combined into one unit by threading the inner cylindrical tube 3 so that it can screw onto the threaded portion 13 of a short cylindrical tube 12 that has been compression fit over the existing airlift tube 18 in the manner already described.

Figure 6:
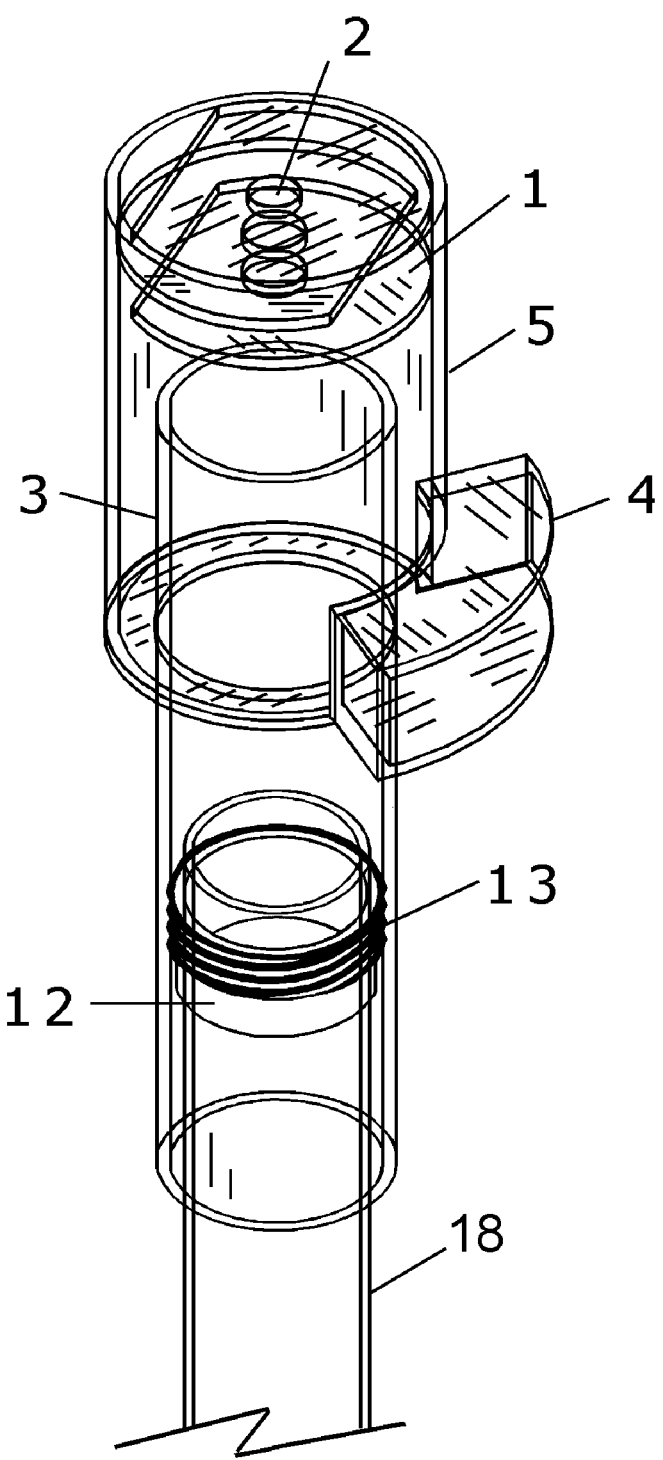
FIG. 6 is a see-through perspective of a height adjustable anti-spray airlift tube elbow.

An anti-spray airlift tube elbow, that has been made height adjustable, by threading the interior of the inner cylindrical tube 3, to allow easy height adjustment, after placement on the standard airlift tube 18, when used in combination with the threaded portion 13 of a short cylindrical tube 12, is represented by FIG. 6.

Figure 5:
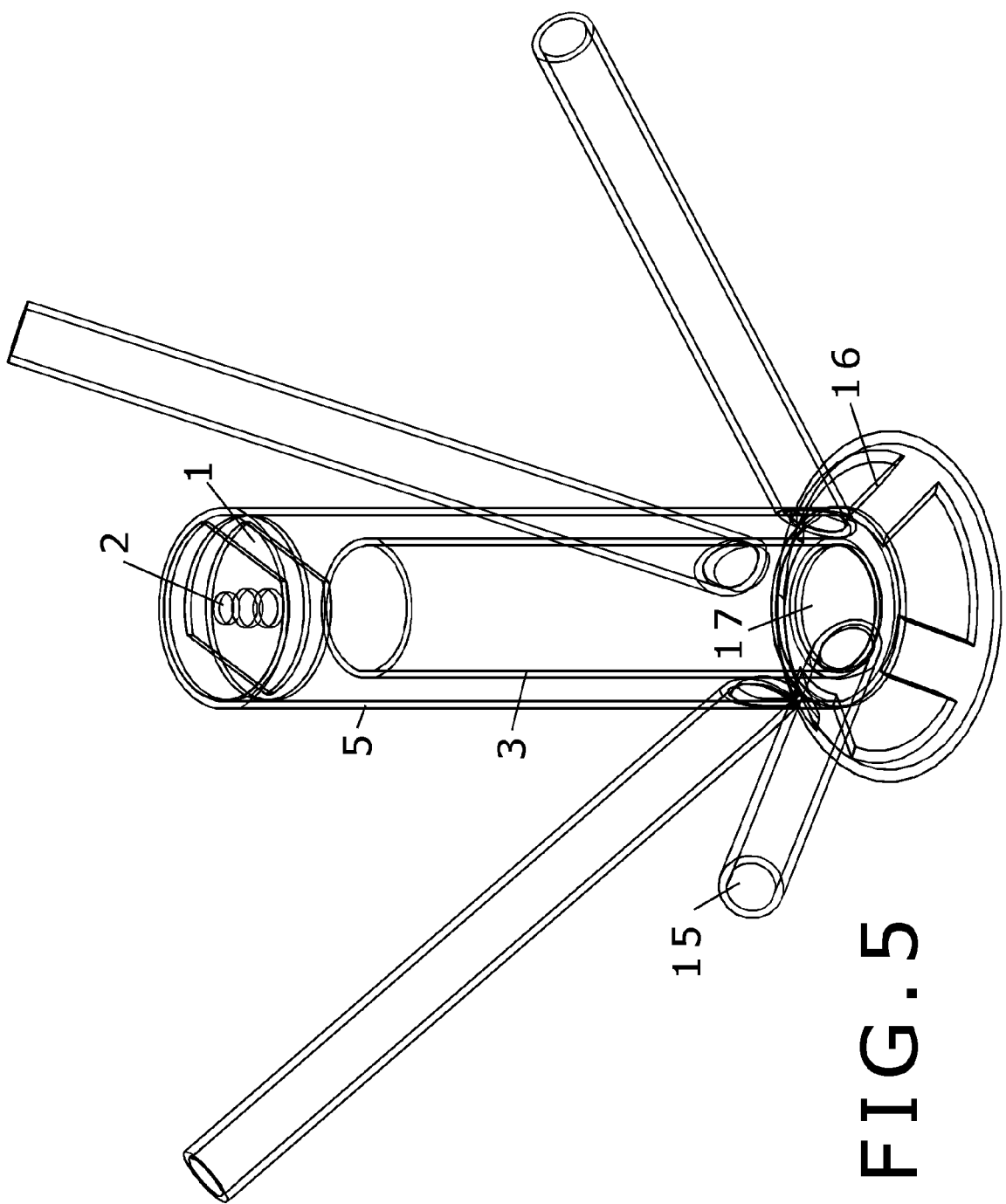
FIG. 5 is a see-through perspective of standalone anti-spray aerator.

A standalone anti-spray aerator with an integrated airlift tube, appropriate for the aeration of a shallow tank, perhaps for the aquatic animal culturing of food chain type organisms, such as phytoplankton, rotifers and brine shrimp, in a tank that doesn't have an undergravel filter, is shown in FIG. 5. Anti-spray technology is particularly useful in this type of tank as there will typically be no light hood to protect the lighting fixtures.

Openings in the truncated conical shell base 16 of the standalone anti-spray aerator FIG. 5 allows non-aerated water to flow through the bottom of the inner cylindrical tube 17. Although a truncated conical shell base 16 is shown, a base of any geometric shape or size could be used, as long as it serves the dual function of providing opening(s) for the flow of water, and also elevating the upper structure sufficiently to allow space for the opening(s).

By the use of a truncated conical shell base 16 that extends past the sides of the outer cylindrical tube 5 substantially, however, enhanced stability in regard to upright stability is obtained.

Airline tubing is inserted, water flow created and water spray from the implosion of aeration bubbles is contained in exactly the same manner as already described for the anti-spray airlift tube elbow FIG. 1. However, in order to prevent the short circuiting of water flow, directly from any exit jets back into the water flow openings in the truncated conical shell base 16, which would dramatically reduce the percentage of the water in the shallow tank being continuously aerated, rising extended exit jets 15 have been provided, to not only release the freshly aerated water near the surface, where it will then have to travel the entire height of the shallow tank before being re-aerated, but by also providing multiple rising extended exit jets 15, freshly aerated water is released in more than one location, the net result being more complete recirculation of any stagnated water pockets that would likely occur otherwise due to poor circulation patterns. As is well known, gaseous or liquid fluids when released in a jet create stagnant areas and do not necessarily mix uniformly.

Although the rising extended exit jets 15 are shown extending upwards at a 45 degree angle, it is understood that a steeper rise might be required to fit into smaller tanks, or that the risers 15 could extend horizontally and then go straight up and down if needed with little change in performance.

Although the present invention has fully been described in connection with the illustrative examples, it is to be noted that various changes and modifications can be readily conceived by those skilled in the art. Such changes and modifications are to be understood as included within the scope of the present invention as defined by the appended claims, unless they depart therefrom.

The invention claimed is:

1. An anti-spray, spray containment terminus for an aquarium airlift tube in which upward water flow is created by the combination of a tube and the natural buoyancy of aeration bubbles that performs the dual purpose of preventing the escape of aeration bubbles from the airlift tube and anti-spray terminus assembly, and a means for preventing the spray of fluids resulting from the implosion of the contained aeration bubbles from escaping from the said anti-spray terminus, without the need for any filtering materials or water pump in order to contain the spray, wherein the aeration bubbles are removed from the water flow by the means of an inner and outer cylindrical tube, that achieve the purpose of channeling the upward water flow from an aquarium airlift tube to a downward direction, an upper air baffle that allows free passage of air while at the same time intercepting the passage of spray and an exit jet that has been placed beneath the water surface deeply enough, so that the natural buoyancy of the aeration bubbles will have counteracted the velocity of the downward flowing water sufficiently to allow the aeration bubbles to be contained.

2. The anti-spray terminus of claim 1 wherein the said upper air baffle is comprised of a series of stacked, sequential opposing shelves, each shelf of which does not completely reach from one side to the other, the said shelves of which have been separated from each other sufficiently in order to allow airflow between them and on only one side of each opposing shelf the airflow path of which alternates from side to side.

3. The anti-spray terminus of claim 2 wherein the shelves of the air baffle have been provided with aligned holes to allow for the insertion of airline tubing.

4. The anti-spray terminus of claim 3 wherein the air baffle has been formed into two interlocking pieces by attaching the stacked, sequential shelves to two half cylindrical shells with female matching indentations formed into the sides of the half cylindrical shells in order to accept the exposed male portions of the opposing stacked, sequential shelves on the matching piece.

5. The anti-spray terminus of claim 1 wherein the exiting jet of water is diverted through a four sided channel, the vertical walls of which flare outwards to disperse the exiting jet of water over a wider area.

6. The anti-spray terminus of claim 1 that has been made height adjustable by threading the said inner cylindrical tube, and which subsequently screws onto a short cylindrical tube that has been threaded with matching male or female threads that has been compression fit onto the top of a standard airlift tube.

7. The anti-spray terminus of claim 1 that has been turned into a stand alone unit by the addition of a base that serves the dual function of providing opening(s) for the flow of water, and also elevating the upper structure sufficiently to allow space for the opening(s) to allow the upward flow of water into the said inner cylindrical tube.

8. The anti-spray terminus of claim 7 wherein the exiting jet of water is diverted through an extended riser(s) to force freshly aerated water to take a longer path before being recirculated.

* * * * *